US008597389B2

(12) United States Patent
Ton

(10) Patent No.: US 8,597,389 B2
(45) Date of Patent: Dec. 3, 2013

(54) FILTRATION LIGHTING SYSTEM

(76) Inventor: Quy That Ton, Baton Rouge, LA (US)

( * ) Notice: Subject to any disclaimer, the term of this patent is extended or adjusted under 35 U.S.C. 154(b) by 355 days.

(21) Appl. No.: 12/502,384

(22) Filed: Jul. 14, 2009

(65) Prior Publication Data

US 2011/0011045 A1 Jan. 20, 2011

(51) Int. Cl.
*B01D 19/00* (2006.01)

(52) U.S. Cl.
USPC ................ 55/471; 55/470; 55/486; 55/385.1; 55/467; 55/505

(58) Field of Classification Search
USPC ............ 55/471, 385.1, 385.2, 410, 357, 467, 55/473, DIG. 39, 486, 320, 505, 510, 470, 55/472, 481, DIG. 29; 422/121; 96/224, 96/222, 16, 63, 68; 95/273, 57, 63
See application file for complete search history.

(56) References Cited

U.S. PATENT DOCUMENTS

| | | | | |
|---|---|---|---|---|
| 3,510,228 | A | 5/1970 | May | |
| 3,516,232 | A * | 6/1970 | Gilbertson | 96/147 |
| 3,923,482 | A * | 12/1975 | Knab et al. | 55/412 |
| 6,984,259 | B2 * | 1/2006 | Hurst | 95/273 |
| 7,083,659 | B1 * | 8/2006 | Joyce et al. | 55/385.1 |
| 2006/0130446 | A1 * | 6/2006 | Herbst | 55/385.1 |

FOREIGN PATENT DOCUMENTS

EP 0088567 9/1983

* cited by examiner

*Primary Examiner* — Jason M Greene
*Assistant Examiner* — Karla Hawkins
(74) *Attorney, Agent, or Firm* — Minh N. Nguyen, Esq.; Next IP Law Group LLP

(57) ABSTRACT

Disclosed are various embodiments of a filtration lighting system. In one embodiment, the filtration lighting system includes at least one light source, a circulation fan, at least one air filter, and a housing. The housing includes at least one air inlet and is configured to house the light source, the circulation fan, and the at least one air filter.

13 Claims, 4 Drawing Sheets

FILTRATION LIGHTING SYSTEM

BACKGROUND

In a salon, manicure, pedicure, or other environment, the air in and around a workspace or other area may include various contaminants, pollutants, particulates or other airborne matter. Such workspace or other area may also require illumination in order for a manicurist, pedicurist, salon professional, or other person to perform one or more tasks. Such persons using a workspace or other area may be subjected to inhalation and/or ingestion of such contaminants, pollutants, particulates, or other airborne matter.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figures 1, 2:
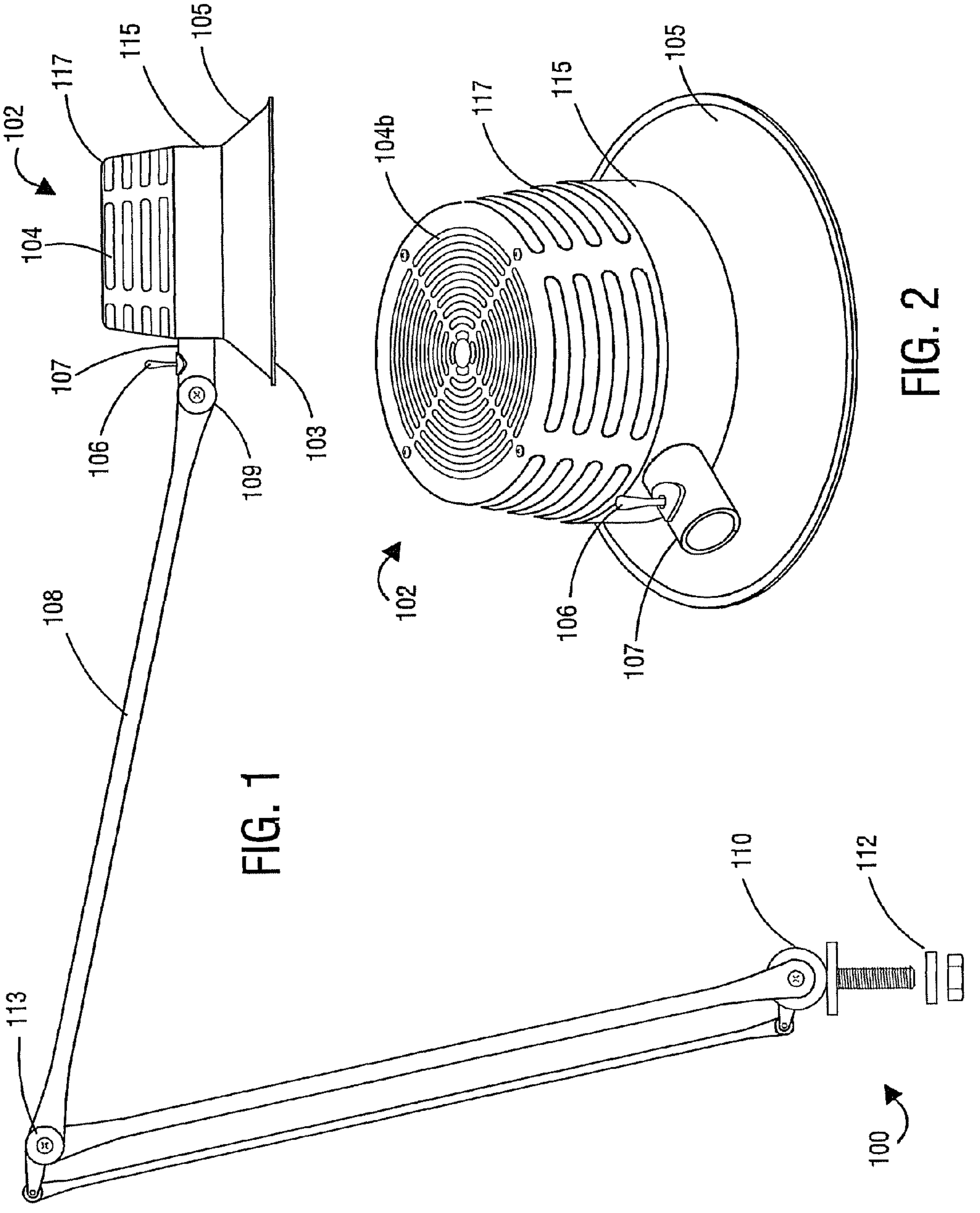
FIG. 1 is a side view of a filtration lighting system in accordance with one embodiment of the disclosure.
FIG. 2 is a perspective view of the housing of a filtration lighting system in accordance with one embodiment of the disclosure.

With reference to FIG. 1, shown is one example of an embodiment of a filtration lighting system. The system includes at least one housing 102 substantially enclosing at least one light source, a filtration system, and a fan (e.g., a circulation fan) configured to direct air through the housing. The light source can be configured to emit light from a surface 103 of the system to illuminate a workspace or other area. The filtration system and fan can also be configured to receive and/or filter air from a workspace. The filtration system and fan will be discussed in greater detail with reference to FIG. 3 herein. The system further includes at least one air outlet 104 configured to allow air to exit the depicted housing 102.

The depicted filtration lighting system 100 can be configured with a light source reflector 105. The light source reflector 105 can reflect light emitted from a light source disposed on or within the housing 102 toward a workspace at which the filtration lighting system. In other words, the light source reflector 105 can direct light emitted from a light source of the filtration lighting system toward a workspace that is illuminated by the system 100 and/or at which the system 100 is pointed.

A filtration lighting system can also include at least one switch 106 or activation system configured to activate the filtration lighting system. Because the filtration lighting system can operate in various modes, a switch 104 facilitating a plurality of modes can be employed. As a non-limiting example, the filtration lighting system can be operated in a filtration mode, a lighting mode, and a filtration lighting mode. Therefore, a switch 106 facilitating at least four modes can be employed in the above example to support the various modes as well as an inactivated mode. It should be appreciated that various modes and permutations of activating the various systems of the filtration lighting system can be supported, and that the above example as well as the example in the depicted FIG. 1 are merely exemplary.

The filtration lighting system can include an arm 108 coupled to the housing 102 at a first end 109 via an arm coupler 107 of the housing 102. The arm coupler 107 extends from a lower housing 115. The arm 108 can include a second end 110 that can be coupled to a surface such as a desk, table, workstation, or other surface via connection system 112. The arm 108 can be implemented in various configurations. As a non-limiting example, the depicted arm 108 includes a joint 113 allowing the arm to be adjusted and/or folded at various heights and/or depths relative to a workspace. As an additional non-limiting example, the system can be configured with a telescoping arm allowing the system to be extended and/or retracted. It should be appreciated that various arm 108 configurations and/or permutations can be chosen in accordance with the disclosure. The lower housing portion 115 can be configured to house a fan, filtration system and/or a light source. The upper housing portion 117 can be configured to include the one or more air outlets 104 of the system.

Reference is now made to FIG. 2, which depicts a perspective view of the housing 102. In the depicted embodiment, the housing 102 can further include air outlets 104*a*, 104*b* that can be positioned on various surfaces of the housing to permit venting of air away from a workspace over which the filtration lighting system is positioned. It should be appreciated that the air outlets 104 can be employed and/or positioned in various configurations on the housing, and that the depicted configuration is but one non-limiting example.

Figure 3:
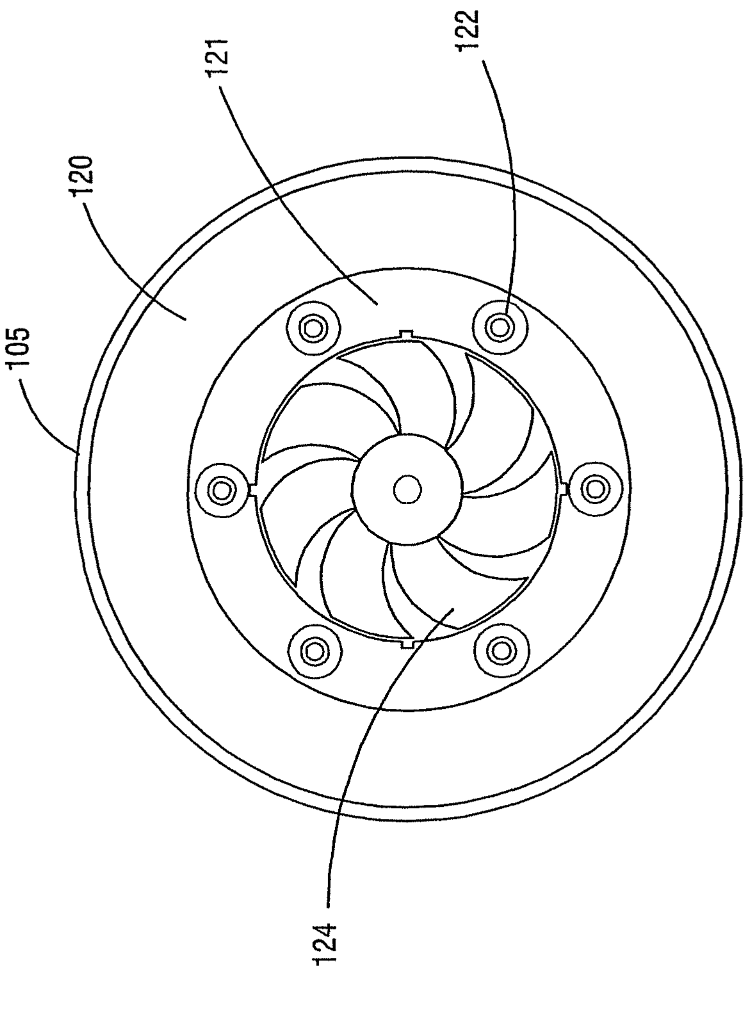
FIG. 3 is a bottom plan view of the housing of a filtration lighting system in accordance with one embodiment of the disclosure.

Accordingly, reference is now made to FIG. 3, which depicts a bottom plan view of the housing 102 in accordance with an embodiment of the disclosure. The depicted view illustrates a bottom surface 120 of the housing 102, which reveals one exemplary configuration of the light source 122 and fan 124. The bottom surface 120 of the housing can also be configured beneath, near or adjacent to the light source reflector 105. In the depicted example, the light source 122 is disposed within or on the housing 102 within or extending from a light mounting member 121. The light source 122 can also be mounted flush with the light mounting member 121 such that the one or more elements of the light source are flush with the bottom surface 120 and the light mounting member 121. The light source 122 can be further configured to emit light in order to illuminate a workspace or other area. As one non-limiting example, the light source can be configured to illuminate a manicurist workstation. The light source 122 can include a plurality of light emitting diodes (LEDs) positioned in a radial pattern (as in the depicted non-limiting example) around the light mounting member 121 of the housing 102. In the depicted example, the LEDs are radially positioned about the fan 124. LEDs can also be positioned and/or disposed on or adjacent to the housing 102 in various configurations.

As an alternative non-limiting example, a plurality of LEDs can be positioned in rectangular, hexagonal, octagonal, or other configurations as should be appreciated. It should be noted that any arrangement of LEDs can be employed in accordance with the disclosure to emit light to illuminate a workspace or other area and that the above noted configurations are merely exemplary. The light source 102 can include a dimmable configuration of LEDs, and may further include include one or more incandescent and/or fluorescent light sources.

As noted above, the filtration lighting system includes at least one fan 124 configured to direct air from a workspace or other area that can be illuminated by the light source 122. The fan 124 can vent air and/or contaminants, particles, particulates or other airborne matter through the housing. In other words, the fan 124 can direct airflow from a workspace illuminated by the light source 122 through the air outlets 104 of the housing 102. The fan 104 may also be configured to operate at various speeds and at various angles relative to the direction of light emission from the light source. In addition, fans having varying properties can be chosen with respect to the velocity and volume of air that it may vent through the housing 102.

Figure 4:
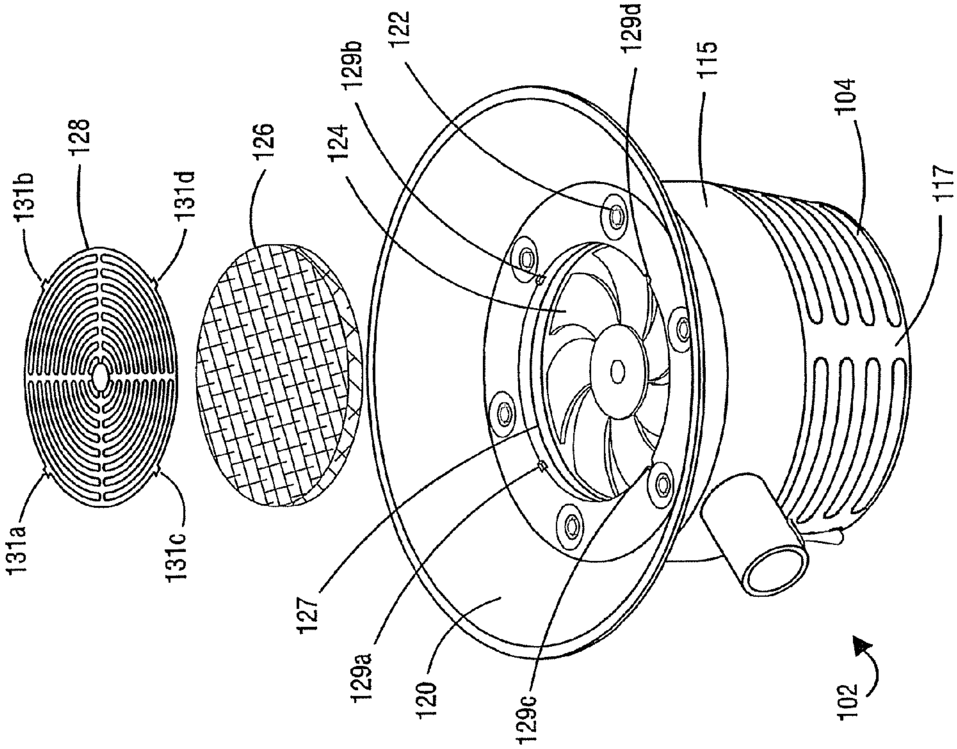
FIG. 4 is a partially exploded perspective view of the housing of a filtration lighting system in accordance with one embodiment of the disclosure.

Reference is now made to FIG. 4, which depicts a perspective view of the housing 102 of the filtration lighting system. The fan 124 can be configured to direct air from a workspace or other area through at least one air filter 126 that may also be positioned or disposed within the housing 102. Accordingly, in the depicted example, an air filter 126 can be positioned within the lower housing 115 adjacent to or near the light reflector 105 in order to filter air that is vented by the fan 124 through the housing 102. More specifically, the air filter 126 is positioned in the middle of the light mounting member 121. Additionally, the air filter 126 can also be positioned on a filter mounting ridge 127. The filter mounting ridge 127 can be configured to separate the air filter 126 from the fan 124 within the housing 102.

Various filter types can be chosen in accordance with the disclosure, which can include, but are not limited to: high efficiency particulate air (HEPA), charcoal, plastic, foam, paper, fabric, cotton, cellulose, oil bath, polyurethane foam, and other filter types. In addition, the filter may be positioned and/or configured in various ways without departing from the disclosure. As a non-limiting example, the filter 126 can be positioned in or on any path of the airflow generated by the fan 124. Therefore, airborne particulates and/or contaminants can therefore be substantially filtered from the air directed through the housing 102 by the fan 124.

The lower housing 115 can include at least one air inlet and the upper housing 117 can include the at least one air outlet 104 in order to provide a path for airflow while substantially concealing interior components of the filtration lighting system from view. Accordingly, air inlet plate 128 can be employed as depicted in the non-limiting example of FIG. 4. In one non-limiting embodiment, air inlets can be provided by the air inlet plate 128 on the bottom surface 120 of the housing 102 surrounded by a plurality of radially positioned LEDs mounted on the light mounting member 121. Additionally, the embodiment can also provide a plurality of air outlets 104 to provide an airflow path through the housing 102 and/or filter 126. The air inlet plate can be mounted and secured to the housing 102 via a tongue and groove or other mounting system. In one embodiment, the air inlet plate 128 can include one or more mounting prongs 131 configured to engage the housing 102 via one or more mounting grooves 129 within the housing 102. Accordingly, in one embodiment, upon engagement and rotation of the air inlet plate 128, the air inlet plate 128 can be substantially secured to the housing 102 while providing air inlets for the system 100.

Figure 5:
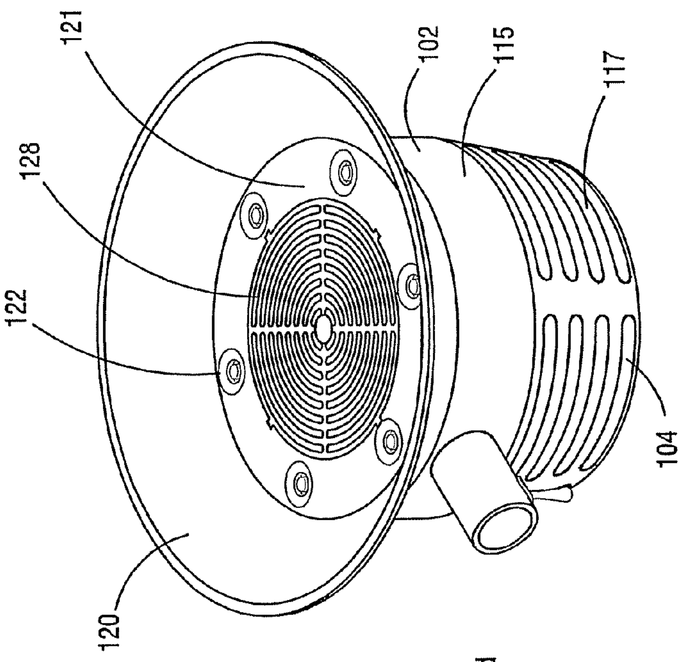
FIG. 5 is a perspective view of a substantially assembled housing of a filtration lighting system in accordance with one embodiment of the disclosure.

Reference is now made to FIG. 5, which depicts a substantially assembled perspective view of the housing 102 and various components of the filtration lighting system noted above. In the depicted non-limiting example, a light source 122 is provided by a plurality of LEDs on or near a bottom surface 120 and/or light mounting member 121. The LEDs can be radially positioned about an air inlet plate 128 that provides at least one air inlet into the housing. One or more fans 124 and/or air filters 126 (FIG. 4) can be positioned within the housing 102. Upon activation of the fan, airflow can be directed into the housing 102 through the air inlet plate 128 and exit the housing 102 through one or more air outlets 104. The airflow can be directed through an air filter positioned between the air inlets and air outlets such that air directed through the housing 102 is filtered by the air filter 126.

Figure 6:
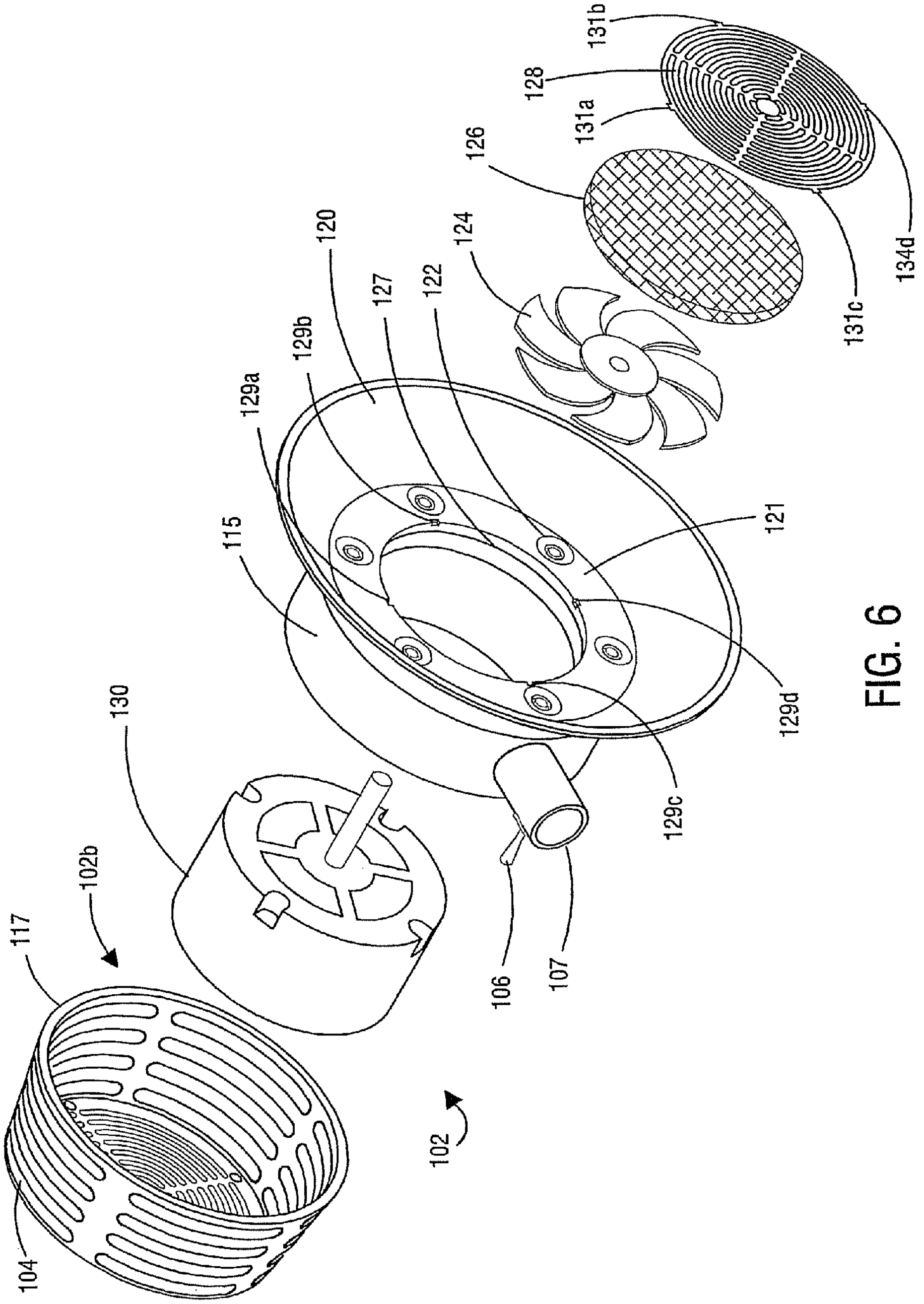
FIG. 6 is an exploded perspective view of the housing of a filtration lighting system in accordance with one embodiment of the disclosure.

Reference is now made to FIG. 6, which depicts an exploded perspective view of the housing 102 and its various components of a filtration lighting system in accordance with one embodiment of the disclosure. In the depicted non-limiting example, a light source 122 is configured to illuminate a workspace or other area at which the housing 102 is pointed. A light reflector 120 is configured to direct light emitted by the light source 102 to the workspace. In one embodiment, a plurality of LEDs can be radially disposed about a light mounting member 121 and a fan 124 that is configured to direct air through the housing 102 from a workspace or other area at which the bottom surface 120 of the housing 102 is pointed. Air filter 126 can be positioned within the housing 102 to filter air directed through the housing 102 by the fan 124. The air filter 126 can be disposed on a filter mounting ridge 127 that is configured to separate the air filter 126 from the fan 124 in operation.

Air inlet plate 128 can be positioned to provide air inlets for air to be directed into the housing 102 while substantially concealing internal components disposed within the housing 102 from view. The air inlet plate 128 can be secured to the lower housing 115 via a tongue and groove mounting system. It should be appreciated that various mounting and/or securing configurations can be used. In the depicted example, mounting prongs 131 extend from the air inlet plate and are configured to mate with corresponding mounting grooves 129 of the lower housing 115. Upon mating and/or rotation of the air inlet plate with respect to the mounting grooves 129, the air inlet plate 128 can be secured to the lower housing 115 and provide air inlets as well as substantially conceal the air filter 126 and/or fan 124.

Fan motor 130 can be positioned within the upper housing 117 and extend into the lower housing 115 to couple to the fan 124. The fan motor 130 can further actuate the fan 124 to provide airflow through the housing 102. Air outlets 104 can be positioned on the upper housing 117 to allow air that has passed through the air inlets to exit the housing 102 upon passage through the air filter 126.

A filtration lighting system in accordance with the disclosure can be employed, for example, by a manicurist, pedicurist, salon professional, or anyone desiring illumination of a workspace as well as filtration and/or venting of air in and around a workspace. As noted above, an embodiment of a filtration lighting system can include at least one light source configured to emit light to illuminate a workspace or other area. The filtration lighting system can be further configured to vent air, particles and/or containments from a workspace or other area and into the filtration lighting system via a fan. An air filter can further be configured to filter air in and around an area at which the light source is directed. As it should be appreciated that, particularly when employed by a manicurist and/or salon professional, the air emanating from a workspace can include contaminants, particulates, or other air particles, the disclosed filtration lighting system can clean air directed through the housing by use of a filter and/or filtration system.

The depicted filtration lighting system can also include at least one positioning arm configured to allow a user to adjust the positioning and/or angle of the filter light system. A filtration lighting system can further be operated in various modes. In one non-limiting exemplary mode, the light source, fan and/or filtration system can be activated. In another non-limiting exemplary mode, the light source can be activated while the fan and/or filtration system are deactivated. In yet another exemplary mode, the light source, fan and/or filtration system can be deactivated.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. As one example, the various components of the disclosed system can be positioned in various ways and in various configurations consistent with the scope of the disclosure. All such modifications and variations are intended to be included herein within the scope of this disclosure and the present invention and protected by the following claims.

Therefore, having thus described the invention, at least the following is claimed:

1. A lighting system, comprising:

a plurality of light sources;

a circulation fan;

at least one air filter, a light/air circulation housing having an air inlet structure, wherein the light sources, the circulation fan, and the at least one air filter are disposed within the light/air circulation housing, wherein the at least one air filter is positioned between the air structure and the circulation fan; and a light surface structure that is disposed within the light/air circulation housing and surrounds the air inlet structure, wherein the plurality of light sources are disposed on the light surface structure generally surrounding the air inlet structure.

2. The lighting system of claim 1, wherein the plurality of light sources further comprise a plurality of light emitting diodes (LEDs).

3. The lighting system of claim 1, wherein the plurality of light sources further comprise at least one of: an incandescent bulb, a fluorescent bulb, and a compact fluorescent bulb.

4. The lighting system of claim 2, wherein the LEDs are arranged on the light surface structure generally surrounding the at least one air inlet.

5. The lighting system of claim 1, wherein the air inlet further comprises a fan cover.

6. The lighting system of claim 1, further comprising an arm coupled at a first end to the housing.

7. The lighting system of claim 6, wherein the arm further comprises a second end, the second end having a connection system configured to secure the arm to a second surface.

8. The lighting system of claim 7, wherein the second surface further comprises at least one of: a table surface, a desk surface and a workstation surface.

9. The lighting system of claim 1, further comprising a three-way switch configured to cause the lighting system to operate in a first mode; wherein the plurality of light sources are activated and the circulation fan is inactivated, and a second mode wherein the plurality of light sources and the circulation fan are activated.

10. The system of claim 1, wherein the circulation fan is configured to direct airflow into the housing through the air inlet.

11. The system of claim 1, wherein the circulation fan is configured to direct airflow through the air inlet and through the at least one filter.

12. The system of claim 11, wherein the at least one filter is configured to remove contaminants from the airflow.

13. The system of claim 1, wherein the at least one filter is at least one of: high efficiency particulate air (HEPA), plastic, charcoal, foam, paper, fabric, cotton, cellulose, oil bath, and polyurethane foam.

* * * * *